(12) United States Patent
Sherman

(10) Patent No.: US 6,234,068 B1
(45) Date of Patent: May 22, 2001

(54) FOOD SERVICE TRAY SUPPORT

(76) Inventor: Aleksandr Sherman, 4038 Surf Ave., Brooklyn, NY (US) 11224

(*) Notice: Subject to any disclaimer, the term of this patent is extended or adjusted under 35 U.S.C. 154(b) by 0 days.

(21) Appl. No.: 09/656,573

(22) Filed: Sep. 7, 2000

(51) Int. Cl.[7] .................................................. A47J 27/00
(52) U.S. Cl. ...................... 99/449; 99/339; 99/483; 126/9 R; 126/33; 126/40; 211/181.1; 211/189; 248/150; 248/153
(58) Field of Search ................ 99/339, 340, 403–418, 99/448, 449, 483; 126/9 R, 9 A, 33, 39 E, 39 B, 40, 43, 44, 377.1; 211/133.5, 181.1, 189; 248/150, 153

(56) References Cited

U.S. PATENT DOCUMENTS

| | | | |
|---|---|---|---|
| 1,172,355 | * | 2/1916 | Guest .............................. 248/153 X |
| 1,547,200 | * | 7/1925 | Busch ................................... 126/43 |
| 2,190,623 | * | 2/1940 | Benson ................................ 248/150 |
| 3,361,126 | * | 1/1968 | Bloomfield ............................ 126/43 |
| 3,364,844 | * | 1/1968 | Felske ............................... 99/449 X |
| 4,157,801 | * | 6/1979 | Elmer ............................... 248/150 X |
| 4,920,873 | * | 5/1990 | Stevens ............................. 99/449 X |
| 5,119,800 | * | 6/1992 | Roberts et al. ...................... 126/9 R |
| 5,287,800 | * | 2/1994 | Orednick ............................... 99/449 |
| 5,293,859 | * | 3/1994 | Lisker .................................. 99/449 |
| 5,467,697 | * | 11/1995 | Hunziker ............................. 99/449 |
| 5,517,903 | * | 5/1996 | Kaufman .............................. 99/449 |

* cited by examiner

Primary Examiner—Timothy F. Simone
(74) Attorney, Agent, or Firm—Kirschstein, et al.

(57) ABSTRACT

A food service system for supporting a tray includes a frame, a pair of legs pivoted to the frame, and a pair of heater supports pivoted to the legs. In a non-deployed state, the legs and heater supports lie in a common plane for compact transport and storage. In the deployed state, the legs diverge from the frame, and the heater supports extend in a plane below the frame.

9 Claims, 2 Drawing Sheets

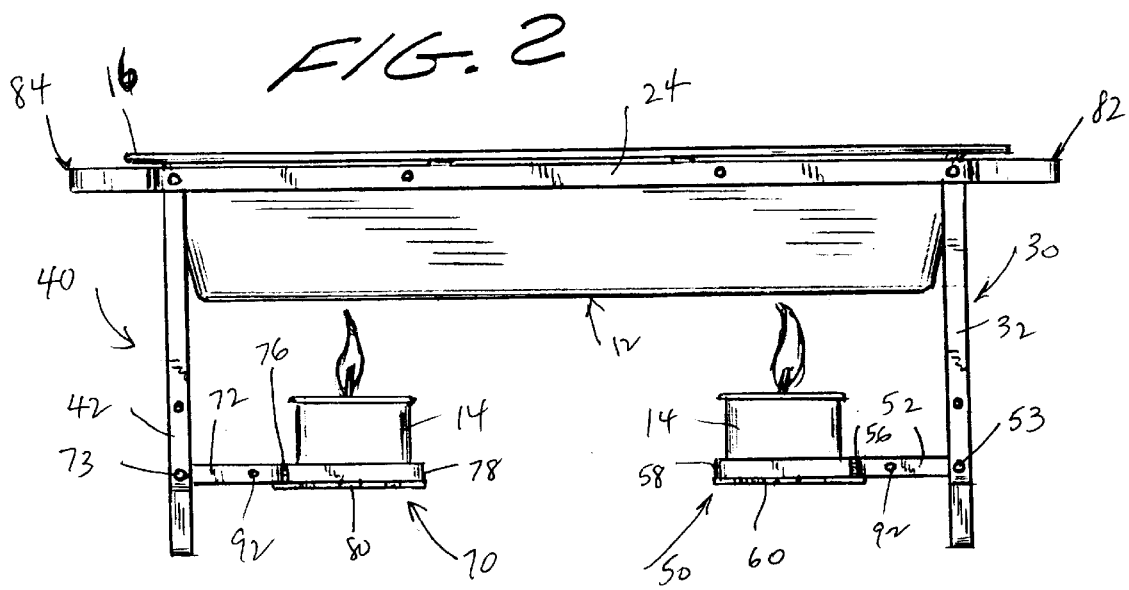
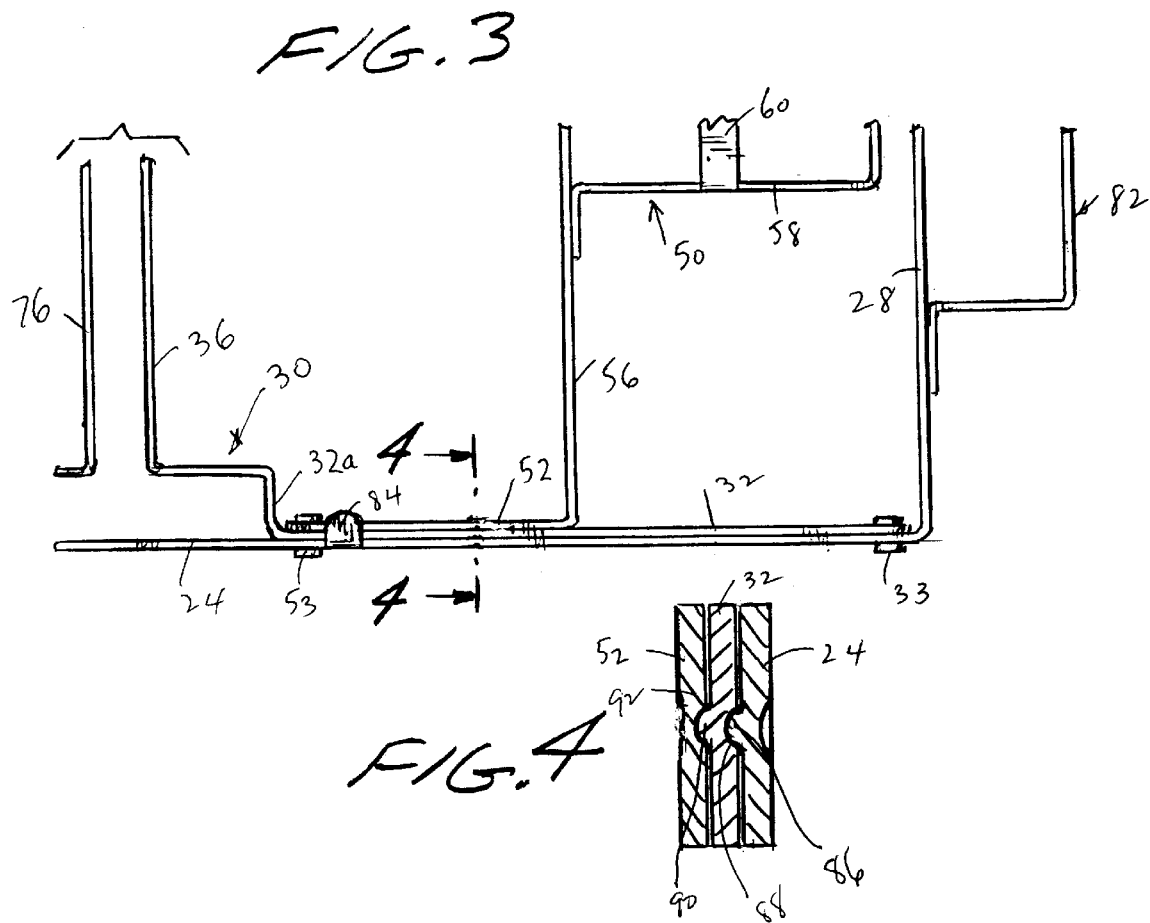

FOOD SERVICE TRAY SUPPORT

BACKGROUND OF THE INVENTION

1. Field of the Invention

The present invention generally relates to a food service system for supporting, heating, serving and displaying food in trays and, more particularly, to a chafing dish assembly that is collapsible for storage and erectable during food service.

2. Description of the Related Art

Caterers, picnickers, campers, householders having a party and the like serve food, and sometimes utensils, in a conventional chafing dish or tray supported on a frame. When the food is to be served hot, it is common to place a petroleum-based gel within a can and commonly referred to as "sterno", or analogous burners, underneath the tray. The tray may be filled with water, and dishes or smaller trays containing the food are placed in the heated water. Alternately, the tray may be directly filled with the food.

U.S. Pat. Nos. 5,467,697, 5,287,800 and 5,517,903 are examples of such chafing dish assemblies which, advantageous as they are in serving heated food, suffer from being difficult to assemble and disassemble at a particular location. Thus, kits of multiple parts have to be assembled and disassembled, and various components have to be manipulated in the process. All such actions detract from the ability to set up and remove a food serving system rapidly and efficiently.

OBJECTS OF THE INVENTION

Accordingly, it is a general object of this invention to quickly set up a food service system, and to quickly collapse and remove the food service system.

SUMMARY OF THE INVENTION

In keeping with the above objects and others which will become apparent hereafter, one feature of the present invention resides, briefly stated, in a food service system, comprising a frame having frame elements bounding a generally horizontal main plane, the frame elements having upper edges for supporting a tray; a pair of legs pivotably connected to the frame for movement between a collapsed position in which the legs lie within the frame and along said main plane, and an erected position in which the legs extend away from, and elevate, the frame relative to a support surface on which the system rests in use; and a pair of heater supports pivotably connected to the legs for movement between a folded position in which the heater supports lie within the legs and along said main plane, and an unfolded position in which the heater supports extend away from the legs in another generally horizontal plane located below, and generally parallel to, said main plane.

A pair of lifting handles is spaced apart along the frame. In accordance with this invention, the legs and the heater supports automatically move to their erected and unfolded positions upon lifting of the frame by the handles. Conversely, the legs and the heater supports are easily returned to their collapsed and folded positions for storage and transport purposes.

In the preferred embodiment, the frame is generally rectangular. Two of the frame elements extend along longitudinal axes. Another two of the frame elements extend along transverse axes generally perpendicular to the longitudinal axes. The legs are pivoted at opposite ends of the longitudinal frame elements. Each leg has a pair of leg elements pivotably connected to the longitudinal frame elements, and a base element extending between the leg elements and resting on the support surface.

Moreover, each leg element has a ledge, and each heater support is pivotably connected to a respective leg adjacent the ledge, and engages the ledge in the unfolded position. Also, the frame has abutments for engaging the legs in the collapsed position.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2 is a front elevational view of FIG. 1, with a chafing dish tray and a pair of burners mounted on the system during use;

FIG. 3 is a broken-way top plan view of the system of FIG. 1 collapsed in a storage/transport position; and FIG. 4 is an enlarged, sectional view taken on line 4—4 of FIG. 3.

DETAILED DESCRIPTION OF THE PREFERRED EMBODIMENTS

Figure 1:
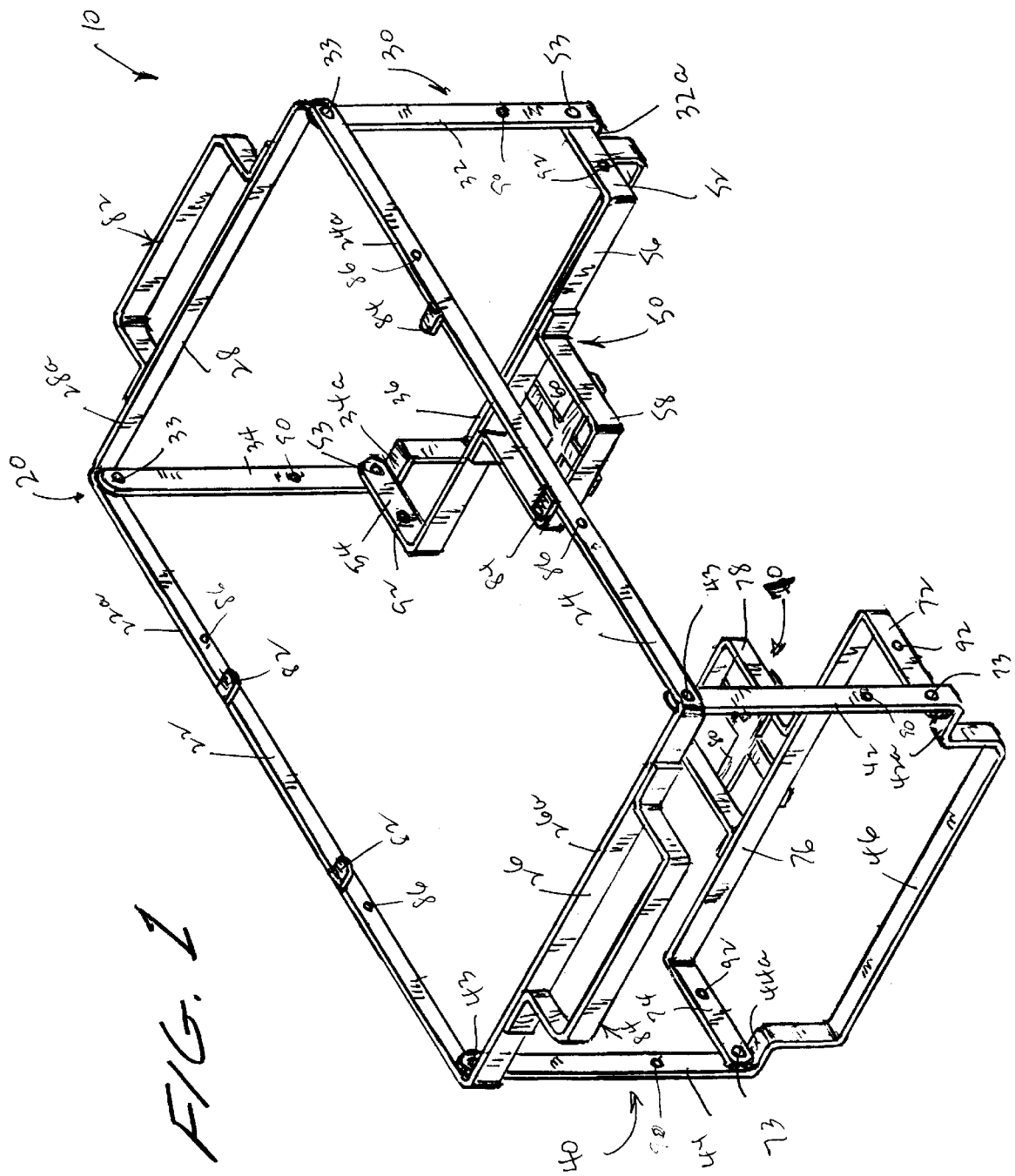
FIG. 1 is a perspective view of a food service system in accordance with this invention.

Referring now to the drawings, reference numeral 10 in FIG. 1 identifies a food service system according to this invention for supporting a chafing dish or tray 12 and a pair of burners 14, as depicted in FIG. 2. The tray 12 is a conventional thin-walled cooking tray, typically constituted of aluminum for heat transfer and strength, and has a flange 16 extending about its entire periphery. Each burner 14 is likewise conventional and, as described above, is preferably a sterno can, although other burners could be used.

The system 10 includes a frame 20 having a pair of longitudinal frame elements 22, 24 extending in mutual parallelism, and a pair of transverse frame elements 26, 28 extending in mutual parallelism. The frame elements define a generally rectangular frame and bound a generally horizontal main plane. The frame elements have upper edges 22a, 24a, 26a, 28a for engaging the peripheral flange 16 and supporting the tray 12 from below.

The system 10 further includes a pair of legs 30, 40 pivotably connected to the frame. Leg 30 has a pair of leg elements 32, 34 pivotably connected at pivots 33 at first ends of the longitudinal frame elements 22, 24, and a base element 36 extending between the leg elements 32, 34 and adapted to rest on a support surface, such as a table top or a counter top. Leg 40 has a pair of leg elements 42, 44 pivotably connected at pivots 43 at second ends of the longitudinal frame elements 22, 24, and a base element 46 extending between the leg elements 42, 44 and adapted to rest on the support surface.

Each leg element has a bend therein and forms a ledge. Thus, leg elements 42, 44 have ledges 42a, 44a which are co-planar. Leg elements 32, 34 have ledges 32a, 34a which are co-planar.

The system further includes a pair of heater supports 50, 70 pivotably connected to the legs 30, 40. Support 50 has a pair of support elements 52, 54 pivotably connected at pivots 53 at intermediate regions of the leg elements 32, 34 adjacent the ledges 32a, 34a, and a bridge element 56 extending between the support elements 52, 54. A generally U-shaped side element 58 is secured to the bridge element 56, and bounds a cavity across whose bottom extends a cross-shaped bottom 60, thereby forming a box-like support into which one of the burners 14 is received.

Support 70 has a pair of support elements 72, 74 pivotably connected at pivots 73 at intermediate regions of the leg elements 42, 44 adjacent the ledges 42a, 44a, and a bridge element 76 extending between the support elements 72, 74. A generally U-shaped side element 78 is secured to the bridge element 76, and bounds a cavity across whose bottom extends a cross-shaped bottom 80, thereby forming a box-like support into which another of the burners is received.

A pair of generally U-shaped handles 82, 84 is secured to the transverse frame elements 28, 26, respectively. The handles, as well as the legs and the heater supports are all constructed of flat, stamped, metal links. Rigid attachments are achieved by welding or by riveting. The pivots are metal shafts.

FIGS. 1–2 depict the system deployed in its intended position of use. FIGS. 3–4 depict portions of the system in their non-deployed or folded-up state for transport and storage. In the non-deployed state, the legs 30, 40 lie within the frame elements and along the aforementioned main plane, and the heater supports 50, 70 lie within the legs 30, 40 and along the same main plane. FIG. 3 depicts that the entire system lies flat in a common plane and hence is compact.

To deploy the system to the erected state, one lifts the handles 82, 84 upwardly above the support surface, the legs 30, 40 self-deploy and pivot downwardly about pivots 33, 43 until outer edges of the leg elements 32, 34 abut against the transverse frame element 28, and until outer edges of the leg elements 42, 44 abut against the traverse frame element 26. At the same time, the heater supports 50, 70 self-deploy and pivot downwardly about pivots 53, 73 until lower edges of the support elements 52, 54 abut against the ridges 32a, 34a, and until lower edges of the support elements 42, 44 abut against the ridges 42a, 44a. As depicted in FIG. 2, the legs 30, 40 diverge in a direction away from the frame. Also, the heater supports 50, 70 extend away from the legs in a plane located below, and generally parallel to, the main plane.

As shown, a pair of top stops 82 on the frame element 22, and another pair of top stops 84 on the frame element 24, together serve to prevent the legs and the heater supports from self-deploying in the wrong direction. In other words, the legs and the heater supports are intended to pivot downwardly away from the frame and toward the support surface, and not upwardly above the frame.

In a variation, rather than allowing the legs and the heater supports to fall freely, a plurality of frictional locks are used to temporarily hold the legs and heater supports in place within the frame until deployment is desired. Thus, as shown in FIG. 4, the frame element 24 is formed with a projection or bump 86 which is frictionally received in a recess or dimple 88 in leg element 32. In turn, the leg element 32 is formed with a projection 90 which is frictionally received in a recess 92 in support element 52. These frictional locks hold the legs and heater supports in place. To deploy the legs and heater supports, an installer need only push these elements with enough force to move the respective projections out of their corresponding recesses, after which these components are free to self-deploy as before. These frictional locks are provided on each leg element and support element.

In another variation, each heater support is provided with an additional leg pivotably mounted on the respective side wall 58, and turnable about a longitudinally extending axis. These additional legs provide another measure of support for the burners.

Rather than using flat, stamped metal links, this invention also contemplates utilizing wire, and especially coated wire, for the frame, the legs and the heater supports.

It will be understood that each of the elements described above, or two or more together, also may find a useful application in other types of constructions differing from the types described above.

While the invention has been illustrated and described as embodied in a food service tray support, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A food service system, comprising:

a) a frame having frame elements bounding a generally horizontal main plane, the frame elements having upper edges for supporting a tray;

b) a pair of legs pivotably connected to the frame for movement between a collapsed position in which the legs lie within the frame and along said main plane, and an erected position in which the legs extend away from, and elevate, the frame relative to a support surface on which the system rests in use; and c) a pair of heater supports pivotably connected to the legs for movement between a folded position in which the heater supports lie within the legs and along said main plane, and an unfolded position in which the heater supports extend away from the legs in another generally horizontal plane located below, and generally parallel to, said main plane.

2. The system of claim 1, wherein the frame is generally rectangular, and wherein two of the frame elements extend along longitudinal axes, and another two of the frame elements extend along transverse axes generally perpendicular to the longitudinal axes, and wherein the legs are pivoted at opposite ends of the longitudinal frame elements.

3. The system of claim 2, wherein each leg has a pair of leg elements pivotably connected to the longitudinal frame elements, and a base element extending between the leg elements and resting on the support surface.

4. The system of claim 3, wherein each leg element has a ledge, and wherein each heater support is pivotably connected to a respective leg adjacent the ledge, and engages the ledge in the unfolded position.

5. The system of claim 1, wherein the frame has abutments for engaging the legs in the collapsed position.

6. The system of claim 1, wherein each heater support has support elements bounding a cavity in which a heater is supportably received.

7. The system of claim 1, and further comprising a pair of lifting handles spaced apart along the frame, and wherein the legs and the heater supports automatically move to their erected and unfolded positions upon lifting of the frame by the handles.

8. The system of claim 1, and further comprising frictional locks for preventing undesired pivoting movement of the legs and the heater supports.

9. The system of claim 1, wherein the frame, legs and heater supports are constituted of flat, stamped, metal links.

* * * * *